(12) United States Patent
Imai et al.

(10) Patent No.: US 12,546,031 B2
(45) Date of Patent: Feb. 10, 2026

(54) GROUP III ELEMENT NITRIDE SUBSTRATE AND PRODUCTION METHOD FOR GROUP III ELEMENT NITRIDE SUBSTRATE

(71) Applicant: NGK INSULATORS, LTD., Nagoya (JP)

(72) Inventors: Katsuhiro Imai, Nagoya (JP); Tomohiko Sugiyama, Nagoya (JP); Kentaro Nonaka, Gifu (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/752,892

(22) Filed: Jun. 25, 2024

(65) Prior Publication Data

US 2024/0344238 A1  Oct. 17, 2024

Related U.S. Application Data

(63) Continuation of application No. PCT/JP2022/040285, filed on Oct. 28, 2022.

(30) Foreign Application Priority Data

Feb. 17, 2022  (JP) .................. 2022-023095

(51) Int. Cl.
| | | |
|---|---|---|
| *B32B 3/00* | (2006.01) | |
| *C30B 25/02* | (2006.01) | |
| *C30B 29/40* | (2006.01) | |

(52) U.S. Cl.
CPC .............. *C30B 29/406* (2013.01); *B32B 3/00* (2013.01); *C30B 25/02* (2013.01)

(58) Field of Classification Search
CPC ........................... C30B 29/403; C30B 29/406
See application file for complete search history.

(56) References Cited

U.S. PATENT DOCUMENTS

| | | |
|---|---|---|
| 7,229,926 B2 | 6/2007 | Matsumoto |
| 9,761,754 B2 | 9/2017 | Bower et al. |
| 2017/0186600 A1 | 6/2017 | Ostermaier et al. |

FOREIGN PATENT DOCUMENTS

| | | |
|---|---|---|
| DE | 102016124650 A1 | 6/2017 |
| JP | 2005136167 A | 5/2005 |
| JP | 5244628 B2 | 8/2010 |
| JP | 2016204201 A | 12/2016 |
| WO | 2014068838 A1 | 5/2014 |

OTHER PUBLICATIONS

JP 2000-286449 (Year: 2000).*
International Search Report with English Translation issued in corresponding International Application No. PCT/JP2022/040285 date of mailing Dec. 20, 2022 (5 pages).

(Continued)

*Primary Examiner* — Elizabeth E Mulvaney
(74) *Attorney, Agent, or Firm* — FLYNN THIEL, P.C.

(57) ABSTRACT

A Group-III element nitride substrate includes a first main surface and a second main surface facing each other, wherein, in the first main surface, crystallinity of a first part positioned on a central portion thereof is higher than crystallinity of a second part positioned outside the first part.

14 Claims, 5 Drawing Sheets

(56) References Cited

OTHER PUBLICATIONS

Written Opinion of International Searching Authority issued in corresponding International Application No. PCT/JP2022/040285 dated Dec. 20, 2022 (5 pages).
English Translation of the International Preliminary Report on Patentability, issued in corresponding International Application No. PCT/JP2022/040285, Date of Mailing Aug. 29, 2024 (7 pages).
German Office Action issued in corresponding German Application No. 11 2022 005 786.6 dated Dec. 11, 2025 (10 pages).

* cited by examiner

GROUP III ELEMENT NITRIDE SUBSTRATE AND PRODUCTION METHOD FOR GROUP III ELEMENT NITRIDE SUBSTRATE

CROSS-REFERENCE TO RELATED APPLICATIONS

This application is a continuation under 35 U.S.C. 120 of International Application PCT/JP2022/040285 having the International Filing Date of Oct. 28, 2022, and having the benefit of the earlier filing date of Japanese Application No. 2022-023095, filed on Feb. 17, 2022. Each of the identified applications is fully incorporated herein by reference.

BACKGROUND OF THE INVENTION

Technical Field

The present invention relates to a Group-III element nitride substrate and a method of producing a Group-III element nitride substrate.

Background Art

Group-III element nitride substrates have been used as the substrates of various devices, such as a light-emitting diode, a semiconductor laser, and a power IC.

The Group-III element nitride substrate may be obtained by, for example, as described in Patent Literature 1, adopting a substrate formed of a material different in composition such as a sapphire substrate as a base substrate, and heteroepitaxially growing a Group-III element nitride crystal on the base substrate.

CITATION LIST

Patent Literature

[PTL 1] JP 2005-136167 A

SUMMARY OF THE INVENTION

However, the Group-III element nitride substrate obtained by the heteroepitaxial growth has a problem in that warping is liable to occur.

In view of the foregoing, a primary object of the present invention is to provide a Group-III element nitride substrate in which the occurrence of warping is suppressed.
1. According to an embodiment of the present invention, there is provided a Group-III element nitride substrate including a first main surface and a second main surface facing each other, wherein, in the first main surface, crystallinity of a first part positioned on a central portion thereof is higher than crystallinity of a second part positioned outside the first part.
2. The Group-III element nitride substrate according to the above-mentioned item 1 may be a freestanding substrate of a Group-III element nitride crystal.
3. In the Group-III element nitride substrate according to the above-mentioned item 1 or 2, a half-width W2 of a diffraction peak of a (10-12) plane obtained by X-ray diffraction rocking curve measurement in the second part may be larger than a half-width W1 of a diffraction peak of the (10-12) plane obtained by the X-ray diffraction rocking curve measurement in the first part.
4. In the Group-III element nitride substrate according to the above-mentioned item 3, a ratio (W2/W1) of the half-width W2 with respect to the half-width W1 may be 1.2 or more.
5. In the Group-III element nitride substrate according to any one of the above-mentioned items 1 to 4, in the first main surface, the crystallinity may continuously reduce from the first part toward an outer side.
6. In the Group-III element nitride substrate according to any one of the above-mentioned items 1 to 4, the first main surface may include a region having constant crystallinity from the first part toward an outer side.
7. The Group-III element nitride substrate according to any one of the above-mentioned items 1 to 6 may have a disc shape, and the second part may be positioned on a region of 20% or less of a radius of the first main surface on a radially inner side from an end of the first main surface.
8. In the Group-III element nitride substrate according to any one of the above-mentioned items 1 to 7, the second part may have a low-angle grain boundary formed therein.
9. The Group-III element nitride substrate according to any one of the above-mentioned items 1 to 8 may have a disc shape, and may have a diameter of 75 mm or more.

According to another aspect of the present invention, there is provided a method of producing a Group-III element nitride substrate.
10. A method of producing a Group-III element nitride substrate according to a first embodiment is a method of producing the Group-III element nitride substrate of any one of the above-mentioned items 1 to 9, the method including: preparing a seed crystal substrate including a base substrate including an upper surface and a lower surface facing each other, and a seed crystal film to be formed on the upper surface of the base substrate; growing a Group-III element nitride crystal on the seed crystal film of the seed crystal substrate; and separating the Group-III element nitride crystal from the base substrate, wherein a peripheral edge portion of the seed crystal film of the prepared seed crystal substrate has formed therein a changing portion for changing a degree of growth of the Group-III element nitride crystal from a central portion of the seed crystal film.
11. A method of producing a Group-III element nitride substrate according to a second embodiment is a method of producing the Group-III element nitride substrate of any one of the above-mentioned items 1 to 9, the method including: preparing a seed crystal substrate including a base substrate including an upper surface and a lower surface facing each other, and a seed crystal film to be formed on the upper surface of the base substrate; growing a Group-III element nitride crystal on the seed crystal film of the seed crystal substrate; and separating the Group-III element nitride crystal from the base substrate, wherein growth conditions of the Group-III element nitride crystal are changed between a central portion and a peripheral edge portion of the seed crystal substrate.
12. In the production method according to the above-mentioned item 10 or 11, the base substrate may contain a material different in composition from the Group-III element nitride crystal.

According to still another aspect of the present invention, there is provided a method of producing a Group-III element nitride substrate from which the second part is removed (low-crystalline part-removed substrate).

13. A method of producing a low-crystalline part-removed substrate according to an embodiment of the present invention includes: obtaining the Group-III element nitride substrate of any one of the above-mentioned items 1 to 9; and removing the second part of the Group-III element nitride substrate.

Advantageous Effects of Invention

According to the embodiment of the present invention, the Group-III element nitride substrate in which the occurrence of warping is suppressed can be provided.

DESCRIPTION OF THE EMBODIMENTS

Figure 1:
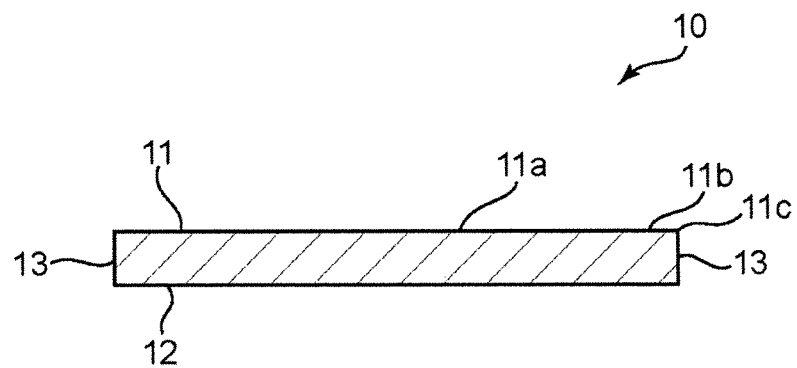
FIG. 1 is a schematic sectional view for illustrating the schematic configuration of a Group-III element nitride substrate according to one embodiment of the present invention.

Embodiments of the present invention are described below with reference to the drawings. The present invention is not limited to those embodiments. In addition, for clearer illustration, some widths, thicknesses, shapes, and the like of respective portions may be schematically illustrated in the drawings in comparison to the embodiments. However, the widths, the thicknesses, the shapes, and the like are each merely an example, and do not limit the understanding of the present invention.

A. Group-III Element Nitride Substrate

Figure 2:
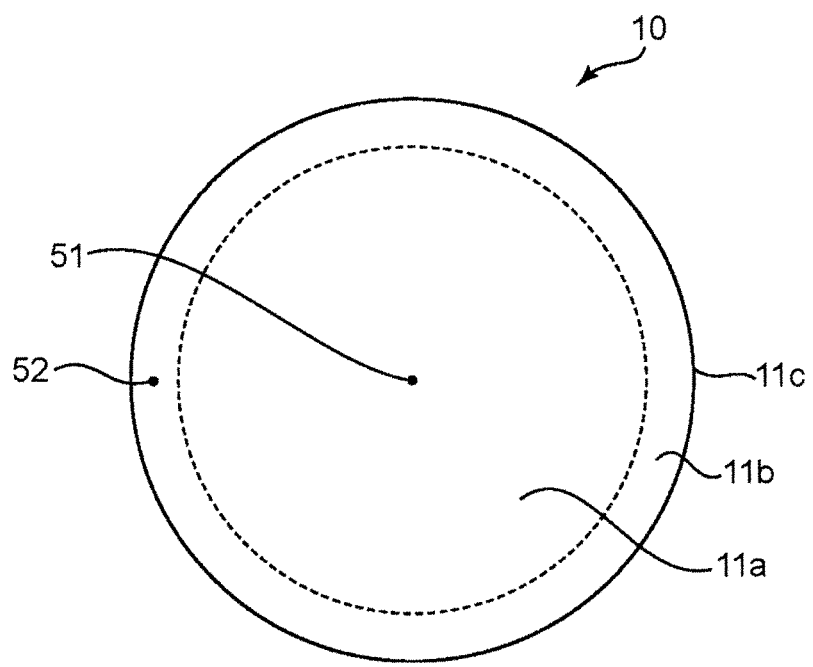
FIG. 2 is a plan view of the Group-III element nitride substrate illustrated in FIG. 1.

FIG. 1 is a schematic sectional view for illustrating the schematic configuration of a Group-III element nitride substrate according to one embodiment of the present invention. FIG. 2 is a plan view of the Group-III element nitride substrate illustrated in FIG. 1. A Group-III element nitride substrate 10 has a plate shape and includes a first main surface 11 and a second main surface 12 facing each other. The main surfaces are linked to each other via a side surface 13.

In the illustrated examples, the Group-III element nitride substrate has a disc shape (wafer), but the shape is not limited thereto and any appropriate shape may be adopted. The size of the Group-III element nitride substrate may be appropriately set in accordance with purposes. The diameter of the Group-III element nitride substrate having a disc shape is, for example, 50 mm or more and 300 mm or less, preferably 75 mm or more, more preferably 100 mm or more. According to the Group-III element nitride substrate having a large size (e.g., having a diameter of 75 mm or more), for example, the productivity of a device having a large size can be improved.

The thickness of the Group-III element nitride substrate is, for example, 250 μm or more and 800 μm or less, preferably 300 μm or more and 750 μm or less, more preferably 350 μm or more and 725 μm or less.

The Group-III element nitride substrate is formed of a Group-III element nitride crystal. For example, aluminum (Al), gallium (Ga), or indium (In) is used as a Group-III element for forming a Group-III element nitride. Those elements may be used alone or in combination thereof. Specific examples of the Group-III element nitride include aluminum nitride ($Al_xN$), gallium nitride ($Ga_yN$), indium nitride ($In_zN$), aluminum gallium nitride ($Al_xGa_yN$), gallium indium nitride ($Ga_yIn_zN$), aluminum indium nitride ($Al_xIn_zN$), and aluminum gallium indium nitride ($Al_xGa_yIn_zN$). In each of the chemical formulae in parentheses, typically, $x+y+z=1$ is satisfied.

The Group-III element nitride may contain a dopant. Examples of the dopant include: p-type dopants, such as beryllium (Be), magnesium (Mg), strontium (Sr), cadmium (Cd), iron (Fe), manganese (Mn), and zinc (Zn); and n-type dopants, such as silicon (Si), germanium (Ge), tin (Sn), and oxygen (O). Those dopants may be used alone or in combination thereof.

In the Group-III element nitride crystal, typically, a <0001> direction is a c-axis direction, a <1-100> direction is an m-axis direction, and a <11-20> direction is an a-axis direction. In addition, a crystal plane perpendicular to the c-axis is a c-plane, a crystal plane perpendicular to the m-axis is an m-plane, and a crystal plane perpendicular to the a-axis is an a-plane. In this embodiment, the thickness direction of the Group-III element nitride substrate 10 is parallel or approximately parallel to the c-axis, and the first main surface 11 is a Group-III element polar surface on a (0001) plane side, and the second main surface 12 is a nitrogen polar surface on a (000-1) plane side.

Typically, the first main surface 11 may be parallel to a (0001) plane, or may be tilted with respect to the (0001) plane. The angle of the tilt of the first main surface 11 with respect to the (0001) plane is, for example, 10° or less, and may be 5° or less, may be 2° or less, or may be 1° or less. The second main surface 12 may be parallel to a (000-1) plane, or may be tilted with respect to the (000-1) plane. The angle of the tilt of the second main surface 12 with respect to the (000-1) plane is, for example, 10° or less, and may be 5° or less, may be 2° or less, or may be 1° or less. The first main surface 11 is not limited to the plane parallel to the (0001) plane or the plane tilted with respect to the (0001) plane, and for example, may be parallel to a non-polar surface, such as an a-plane (11-20) or an m-plane (1-100), or may be parallel to a semipolar surface, such as a (11-22) plane or a (1-101) plane.

The first main surface 11 may have a distribution of crystallinity. Specifically, the first main surface 11 may include a second part 52 that shows lower crystallinity than the crystallinity of a first part 51 positioned on a central portion 11a of the first main surface 11 outside the first part 51. The central portion 11a may be a portion excluding a peripheral edge portion 11b of the first main surface 11.

The second part 52 may be positioned on, for example, the peripheral edge portion 11b of the first main surface 11. The peripheral edge portion 11b means, for example, a region of 20% or less of a radius of the first main surface 11 on a radially inner side from an end 11c of the first main surface 11, and preferably means a region of 15% or less of the radius of the first main surface 11 on the radially inner side from the end 11c of the first main surface 11.

The crystallinity may be evaluated by, for example, a half-width W (unit: arcsec) of a diffraction peak of a (10-12) plane obtained by X-ray diffraction rocking curve measurement (XRC). In this case, a half-width W1 of a diffraction peak of a (10-12) plane obtained by X-ray diffraction rocking curve measurement in the first part 51 is smaller than a half-width W2 of a diffraction peak of the (10-12) plane obtained by the X-ray diffraction rocking curve measurement in the second part 52. Specifically, the half-width W1 is, for example, from 40 arcsec to 60 arcsec, and the half-width W2 is, for example, from 50 arcsec to 70 arcsec. A ratio (W2/W1) of the half-width W2 with respect to the half-width W1 is more than 1, preferably 1.1 or more, more preferably 1.2 or more, still more preferably 1.3 or more. Meanwhile, the ratio W2/W1 is preferably 4.0 or less, more preferably 3.0 or less, still more preferably 2.0 or less from the viewpoint of, for example, quality preservation.

The variation in the half-width W of the diffraction peak of the (10-12) plane obtained by the X-ray diffraction rocking curve measurement in the first main surface 11 is, for example, more than 20%, and may be 25% or more.

An example of the distribution of crystallinity in the first main surface is a form in which the crystallinity continuously reduces from the first part (e.g., the center of the first main surface) toward an outer side. A specific example thereof is a form in which the half-width W of the diffraction peak of the (10-12) plane obtained by the X-ray diffraction rocking curve measurement continuously increases. In this case, the manner of change in the half-width W is not particularly limited, and the half-width W may change linearly with respect to a distance from the first part, or may increase as the distance from the first part increases.

Another example of the distribution of crystallinity in the first main surface is a form in which the crystallinity reduces stepwise (discontinuously) from the first part (e.g., the center of the first main surface) toward the outer side. A specific example thereof is a form in which the half-width W of the diffraction peak of the (10-12) plane obtained by the X-ray diffraction rocking curve measurement increases stepwise. A specific example thereof is a form in which the first main surface includes a first region having a constant half-width W from the first part toward the outer side and a second region having a large half-width W outside the first region. The phrase "having a constant half-width W" as used herein means that the variation in the half-width W is, for example, 20% or less. The first region may correspond to the above-mentioned central portion, and the second region may correspond to the above-mentioned peripheral edge portion.

In one embodiment, a low-angle grain boundary is formed in the second part 52 (peripheral edge portion 11b). The low-angle grain boundary refers to, for example, a grain boundary showing a small difference (e.g., 15° or less) between angles of crystal directions of regions adjacent to each other across the grain boundary. The low-angle grain boundary may be observed by, for example, crystal lattice observation with a transmission electron microscope (TEM) or a backscattered electron beam diffraction method (EBSD) using a scanning electron microscope (SEM). In addition, when a measurement object is formed of a material having translucency, the observation may also be performed by observation with an optical microscope at a high magnification (e.g., 200 times).

In the Group-III element nitride substrate according to the embodiment of the present invention, the occurrence of warping can be satisfactorily suppressed. As the size (e.g., diameter) of the Group-III element nitride substrate becomes larger, a failure, such as warping or a crack, is more liable to occur, and the degree thereof tends to increase. However, according to the embodiment of the present invention, even when the size of the Group-III element nitride substrate is large, the occurrence of warping can be satisfactorily suppressed.

The above-mentioned warping may be evaluated with a laser displacement sensor. As a measurement system of the laser displacement sensor, there are given, for example, a confocal system, a triangular ranging system, and an optical interference system, and the system may be appropriately selected in accordance with the surface roughness of a surface of the measurement object. In one embodiment, the warping of the Group-III element nitride substrate measured with the laser displacement sensor is preferably 100 μm or less, more preferably 60 μm or less, still more preferably 40 μm or less.

The radius of curvature of the Group-III element nitride substrate calculated from the above-mentioned warping measured with the laser displacement sensor is preferably 30 m or more, more preferably 50 m or more, still more preferably 70 m or more, particularly preferably 90 m or more.

B. Production Method

A method of producing a Group-III element nitride substrate according to one embodiment of the present invention includes: preparing a seed crystal substrate including a base substrate and a seed crystal film; growing a Group-III element nitride crystal on the seed crystal film of the seed crystal substrate; and separating the Group-III element nitride crystal from the base substrate.

Figure 3A:
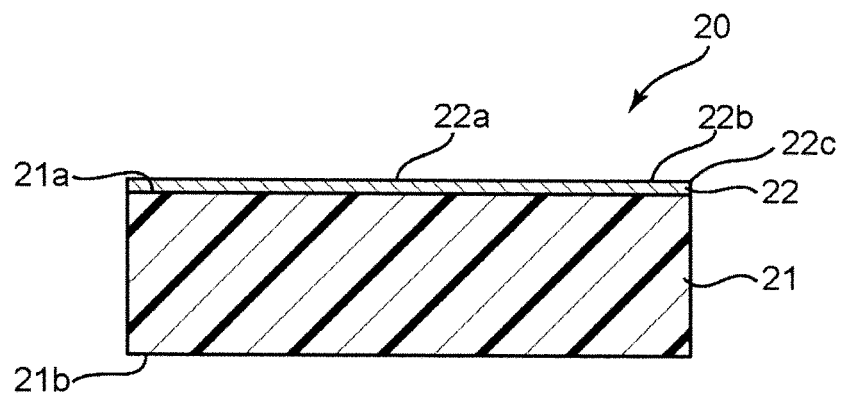
FIG. 3A is a view for illustrating a production process for a Group-III element nitride substrate according to one embodiment.
Figure 3B:
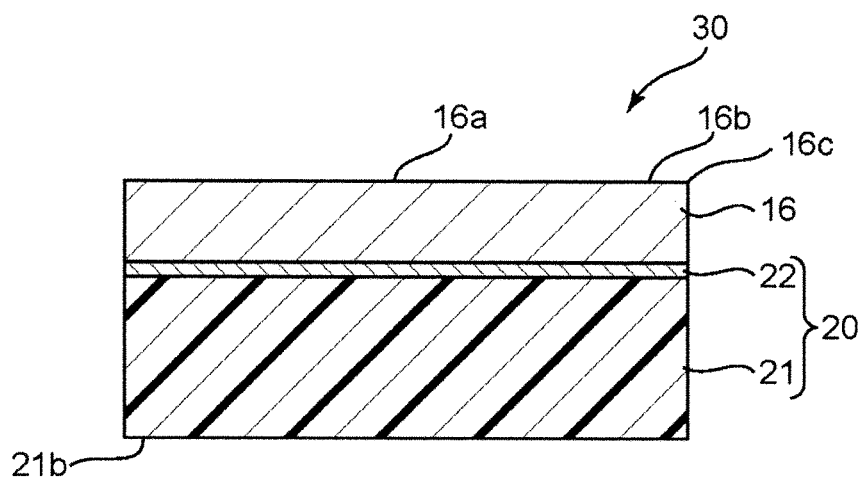
FIG. 3B is a view subsequent to FIG. 3A.
Figure 3C:
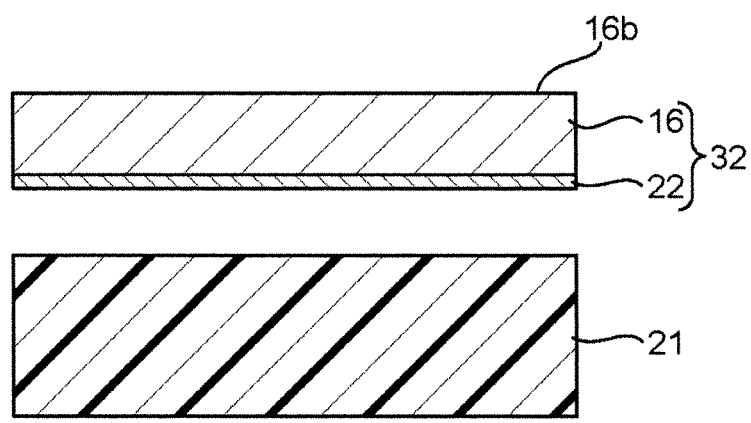
FIG. 3C is a view subsequent to FIG. 3B.

FIG. 3A to FIG. 3C are each a view for illustrating a production process for a Group-III element nitride substrate according to one embodiment. In FIG. 3A, there is illustrated a state in which a seed crystal film 22 has been formed on an upper surface 21a of a base substrate 21 including the upper surface 21a and a lower surface 21b facing each other to complete a seed crystal substrate 20.

For example, a substrate having such a shape and size that a Group-III element nitride substrate having a desired shape and size can be produced is used as the above-mentioned base substrate. Typically, the base substrate has a disc shape having a diameter of from 50 mm to 350 m. The thickness of the base substrate is, for example, from 300 μm to 2,000 μm.

Any appropriate substrate may be used as the base substrate. The base substrate typically includes a monocrystalline body. Examples of a material for forming the base substrate include sapphire, crystal-oriented alumina, silicon, gallium oxide, aluminum gallium nitride, gallium arsenide, and silicon carbide (Sic).

The thickness of the above-mentioned seed crystal film is, for example, from 0.2 μm to 5 μm, preferably from 1 μm to 4 μm. Any appropriate material may be adopted as a material for forming the seed crystal film. A Group-III element nitride is typically used as the material for forming the seed crystal film. In one embodiment, gallium nitride is used. Gallium nitride that is recognized to show a yellow luminescence effect when observed with a fluorescence microscope is preferably used. In such gallium nitride, a peak (yellow luminescence (YL) or a yellow band (YB)) is observed in the range of from 2.2 eV to 2.5 eV in addition to an exciton transition (UV) from a band to another band.

The seed crystal film may be formed by any appropriate method. A vapor growth method is typically used as a method of forming the seed crystal film. Specific examples of the vapor growth method include a metal-organic chemical vapor deposition (MOCVD) method, a hydride vapor phase epitaxy (HVPE) method, a pulsed excitation deposition (PXD) method, a molecular-beam epitaxy (MBE) method, and a sublimation method. Of those, a MOCVD method is preferably used.

The formation of the seed crystal film by the above-mentioned MOCVD method includes, for example, a first formation step and a second formation step in the stated order. Specifically, the first formation step includes forming a first layer (low-temperature grown buffer layer) (not shown) on the base substrate at a temperature T1 (e.g., from 450° C. to 550° C.), and the second formation step includes forming a second layer (not shown) at a temperature T2 (e.g., from 1,000° C. to 1,200° C.) higher than the temperature T1. The thickness of the first layer is, for example, from 20 nm to 50 nm. The thickness of the second layer is, for example, from 1 μm to 4 μm.

In one embodiment, a changing portion for changing the degree of growth of the Group-III element nitride crystal to be described below from a central portion 22a is formed in a peripheral edge portion 22b of the seed crystal film 22. The central portion 22a may be a portion excluding the peripheral edge portion 22b of the seed crystal film 22. The peripheral edge portion 22b means, for example, a region of 20% or less of a radius of the seed crystal film 22 on a radially inner side from an end 22c of the seed crystal film 22, and preferably means a region of 15% or less of the radius of the seed crystal film 22 on the radially inner side from the end 22c of the seed crystal film 22. When the changing portion is formed in the seed crystal film, the distribution of crystallinity of a Group-III element nitride crystal layer to be described below can be achieved.

The above-mentioned changing portion may be formed by, for example, forming, in the peripheral edge portion 22b, a crystal having lower crystallinity than the crystallinity of a crystal positioned on the central portion 22a. Specifically, the changing portion may be formed by setting a half-width $W_B$ of a diffraction peak of a (10-12) plane obtained by X-ray diffraction rocking curve measurement in the peripheral edge portion 22b to be larger than a half-width $W_A$ of a diffraction peak of the (10-12) plane obtained by the X-ray diffraction rocking curve measurement in the central portion 22a. In this case, the half-width $W_A$ is, for example, from 250 arcsec to 350 arcsec, and the half-width $W_B$ is, for example, from 300 arcsec to 500 arcsec. A ratio ($W_B/W_A$) of the half-width $W_B$ with respect to the half-width $W_A$ is more than 1, preferably 1.1 or more, more preferably 1.2 or more, still more preferably 1.3 or more. Meanwhile, the ratio $W_B/W_A$ is preferably 4.0 or less, more preferably 3.0 or less, still more preferably 2.0 or less.

The variation in the half-width W of the diffraction peak of the (10-12) plane obtained by the X-ray diffraction rocking curve measurement in the seed crystal film 22 is, for example, more than 20%, and may be 25% or more. The distribution of crystallinity of the seed crystal film 22 may correspond to the distribution of crystallinity of the Group-III element nitride crystal layer to be obtained.

In addition, the changing portion may be formed by, for example, setting a thickness TB of the seed crystal film 22 in the peripheral edge portion 22b to be smaller than a thickness TA of the seed crystal film 22 in the central portion 22a. The difference between TA and TB is, for example, 100 nm or more, preferably from 250 nm to 1,000 nm.

The changing portion may be formed at the time of the formation of the seed crystal film or may be formed by posttreatment after the film formation.

Next, the Group-III element nitride crystal is grown on the seed crystal film 22 of the seed crystal substrate 20 to form a Group-III element nitride crystal layer 16. Thus, a laminated substrate 30 is obtained as illustrated in FIG. 3B. The degree of growth of the Group-III element nitride crystal (thickness of the Group-III element nitride crystal layer 16) may be adjusted in accordance with a desired thickness of the Group-III element nitride substrate. Any appropriate direction may be selected as the growth direction of the Group-III element nitride crystal layer in accordance with, for example, usage or purposes. Specific examples thereof include: the normal direction of each of the above-mentioned c-plane, a-plane, and m-plane; and the normal direction of a plane tilted with respect to each of the above-mentioned c-plane, a-plane, and m-plane.

The Group-III element nitride crystal may be grown by any appropriate method. The method of growing the Group-III element nitride crystal is not particularly limited as long as a crystal direction substantially following the crystal direction of the above-mentioned seed crystal film can be achieved by the method. Specific examples of the method of growing the Group-III element nitride crystal include: vapor growth methods, such as a metal-organic chemical vapor deposition (MOCVD) method, a hydride vapor phase epitaxy (HVPE) method, a pulsed excitation deposition (PXD) method, a molecular-beam epitaxy (MBE) method, and a sublimation method; liquid phase growth methods, such as a flux method, an ammonothermal method, a hydrothermal method, and a sol-gel method; and a solid phase growth method utilizing grain growth of powder. Those methods may be used alone or in combination thereof.

The flux method (e.g., Na flux method) is preferably adopted as the method of growing the Group-III element nitride crystal. Details of such growth method are described in, for example, JP 5244628 B2, and the growth may be performed by appropriately adjusting the various conditions of the described growth method.

In one embodiment, the growth conditions of the Group-III element nitride crystal are changed between the central portion 22a and peripheral edge portion 22b of the seed crystal film 22. When the growth conditions are changed, the distribution of crystallinity of the Group-III element nitride crystal layer to be described below can be achieved.

The above-mentioned change in the growth conditions may be achieved by, for example, in the liquid phase growth method, controlling a stirring method for a raw material solution or adjusting the composition of the raw material solution. In addition, the change in the growth conditions may be achieved by, for example, in the vapor growth method, controlling the way of flowing (flow amount or flow rate) of a raw material gas or adjusting the flow amount ratio of the raw material gas. In addition, for example, the change in the growth conditions may be achieved by adjusting, for example, a temperature or a pressure.

The Group-III element nitride crystal layer 16 of the laminated substrate 30 may have a distribution of crystallinity. Specifically, a crystal positioned on a peripheral edge portion 16b of the Group-III element nitride crystal layer 16 may show lower crystallinity than that of a crystal positioned on a central portion 16a thereof. For example, a half-width $W_B$ of a diffraction peak of a (10-12) plane obtained by X-ray diffraction rocking curve measurement in the peripheral edge portion 16b is larger than a half-width $W_A$ of a diffraction peak of the (10-12) plane obtained by the X-ray diffraction rocking curve measurement in the central portion 16a. In this case, the half-width $W_A$ is, for example, from 40 arcsec to 60 arcsec, and the half-width $W_B$ is, for example, from 50 arcsec to 70 arcsec. A ratio ($W_B/W_A$) of the half-width $W_B$ with respect to the half-width $W_A$ is more than 1, preferably 1.1 or more, more preferably 1.2 or more, still more preferably 1.3 or more. Meanwhile, the ratio $W_B/W_A$ is preferably 4.0 or less, more preferably 3.0 or less, still more preferably 2.0 or less. The central portion 16a may be a portion excluding the peripheral edge portion 16b of the Group-III element nitride crystal layer 16. The peripheral edge portion 16b means, for example, a region of 20% or less of a radius of the Group-III element nitride crystal layer 16 on a radially inner side from an end 16c of the Group-III element nitride crystal layer 16, and preferably means a region of 15% or less of the radius of the Group-III element nitride crystal layer 16 on the radially inner side from the end 16c of the Group-III element nitride crystal layer 16. When the Group-III element nitride crystal layer 16 having such distribution of crystallinity is formed, the occurrence of warping can be satisfactorily suppressed in the laminated substrate 30 to be obtained, and thus the occurrence of warping can be satisfactorily suppressed in the Group-III element nitride substrate to be obtained.

After the growth of the Group-III element nitride crystal, as illustrated in FIG. 3C, the Group-III element nitride crystal (Group-III element nitride crystal layer 16) is separated from the base substrate 21 to provide a freestanding substrate 32. Typically, as illustrated in FIG. 3C, the freestanding substrate 32 may include the Group-III element nitride crystal layer 16 and the seed crystal film 22. The Group-III element nitride crystal may be separated from the base substrate by any appropriate method. As a method of separating the Group-III element nitride crystal, there are given, for example, a method of causing spontaneous separation from the base substrate by utilizing a thermal shrinkage difference between the Group-III element nitride crystal and the base substrate in a temperature decrease step after the growth of the Group-III element nitride crystal, a separation method including chemical etching, and a laser liftoff method including laser light irradiation. When the Group-III element nitride crystal is separated by the laser liftoff method, typically, laser light is applied from a lower surface 21b side of the base substrate 21 of the laminated substrate 30. In addition, the freestanding substrate may be obtained by grinding, or by cutting with a cutter such as a wire saw.

In the freestanding substrate 32 obtained from the laminated substrate 30 in which the occurrence of warping is suppressed, the occurrence of warping can be satisfactorily suppressed.

Figure 4A:
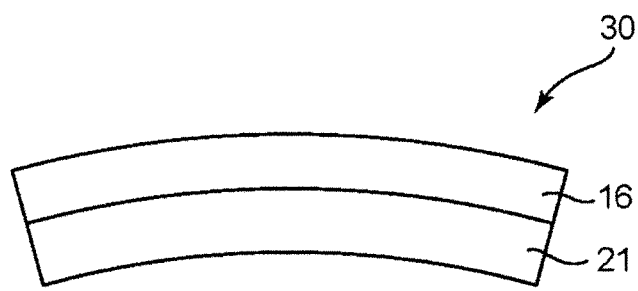
FIG. 4A is a sectional view for illustrating an example of warping that may occur in a laminated substrate.
Figure 4B:
FIG. 4B is a sectional view for illustrating an example of warping that may occur in a freestanding substrate.

FIG. 4A is a sectional view for illustrating an example of warping that may occur in a laminated substrate. FIG. 4B is a sectional view for illustrating an example of warping that may occur in a freestanding substrate. In FIGS. 4, hatching is omitted in a cross section of each of the laminated substrate and the freestanding substrate for ease of viewing of the drawing. In addition, the illustration of the seed crystal film is omitted for convenience.

In the example illustrated in FIG. 4A, convex warping occurs on the Group-III element nitride crystal layer 16 side in the laminated substrate 30. The base substrate 21 may be formed of a material different in composition (chemical composition) from the Group-III element nitride crystal layer 16. When the Group-III element nitride crystal is heteroepitaxially grown on such base substrate 21, warping tends to easily occur on the laminated substrate 30 to be obtained. A cause of the warping is conceived to be, for example, a stress that may occur owing to a mismatch in a lattice constant or a difference in coefficient of thermal expansion between the base substrate 21 and the Group-III element nitride crystal to be grown. The warping may occur when, for example, the temperature of the laminated substrate 30 is decreased after the Group-III element nitride crystal is grown at a high temperature (e.g., from 800° C. to 1,100° C.). When the coefficient of thermal expansion of the base substrate 21 is larger than the coefficient of thermal expansion of the Group-III element nitride crystal to be grown (e.g., when a sapphire substrate is used as the base substrate), as illustrated in FIG. 4A, convex warping may occur on the Group-III element nitride crystal layer 16 side. Meanwhile, when the coefficient of thermal expansion of the base substrate 21 is smaller than the coefficient of thermal expansion of the Group-III element nitride crystal to be grown (e.g., when a silicon substrate or a SiC substrate is used as the base substrate), convex warping may occur on the base substrate 21 side in contrast to the illustrated example.

The above-mentioned warping of the laminated substrate may cause a failure, such as warping or a crack, in the freestanding substrate 32 (Group-III element nitride substrate) to be obtained. In the freestanding substrate 32 obtained by separating the base substrate 21 from the laminated substrate 30 as illustrated in FIG. 4A, the direction of the warping is reversed, and convex warping may occur on a lower surface 33 side on which the base substrate 21 has been arranged, as illustrated in FIG. 4B.

As described above, in each of the laminated substrate and the freestanding substrate according to the embodiment of the present invention, its Group-III element nitride crystal layer has a predetermined distribution of crystallinity, and the occurrence of warping can be satisfactorily suppressed. Specifically, a grain boundary or dislocation may be introduced in a part having low crystallinity, and hence, when a part having low crystallinity is arranged, the above-mentioned mismatch in the lattice can be alleviated. In addition, the stress caused by the above-mentioned thermal expansion difference can be alleviated (diffused). The stress caused by the thermal expansion difference tends to be concentrated on the peripheral edge portion of each of the laminated substrate and the freestanding substrate, and hence, when the part having low crystallinity is arranged in the peripheral edge portion of the Group-III element nitride crystal layer 16, the occurrence of warping can be effectively suppressed.

The freestanding substrate 32 may be used as it is for the above-mentioned Group-III element nitride substrate, or the freestanding substrate 32 may be subjected to any appropriate processing to provide the above-mentioned Group-III element nitride substrate.

An example of the processing to which the above-mentioned freestanding substrate is subjected is grinding (e.g., grinding with diamond abrasive grains) of its peripheral edge portion. Typically, the freestanding substrate is processed into the above-mentioned desired shape and size (e.g., a disc shape having a desired diameter) by grinding.

Part or all of the peripheral edge portion of the freestanding substrate 32 (peripheral edge portion 16b of the Group-III element nitride crystal layer 16) may be removed. In one embodiment, a Group-III element nitride substrate excellent in uniformity of crystallinity can be obtained by removing a part having low crystallinity. Herein, the substrate from which the part having low crystallinity has been removed as described above is referred to as "low-crystalline part-removed substrate." The variation in the half-width W of the diffraction peak of the (10-12) plane obtained by the X-ray diffraction rocking curve measurement in the first main surface of the low-crystalline part-removed substrate is, for example, 20% or less, preferably 15% or less.

Another example of the processing to which the above-mentioned freestanding substrate is subjected is processing, such as grinding or polishing (e.g., lap polishing or chemical-mechanical polishing (CMP)), of its main surface (upper surface or lower surface). Typically, the freestanding substrate is thinned and flattened by the grinding and the polishing so as to have a desired thickness. In one embodiment, the freestanding substrate may be brought into a state of the Group-III element nitride crystal layer 16 alone (a single crystal growth layer alone) by removing the seed crystal film 22 through the processing of the main surface.

In addition, examples of the processing to which the above-mentioned freestanding substrate is subjected include chamfering of its outer peripheral edge, removal of an affected layer, and removal of a residual stress that may result from the affected layer.

C. Usage

Figure 5:
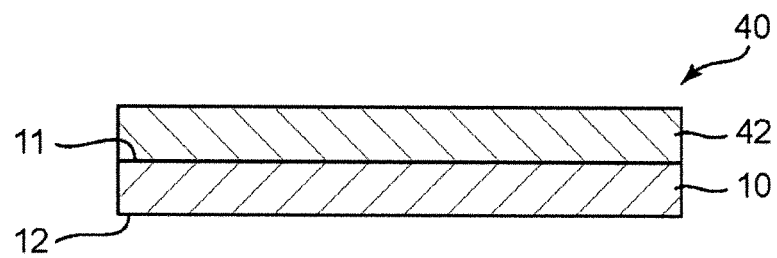
FIG. 5 is a schematic sectional view for illustrating the schematic configuration of a device substrate according to one embodiment of the present invention.

A functional layer may be formed on the above-mentioned Group-III element nitride substrate. FIG. 5 is a schematic sectional view for illustrating the schematic configuration of a device substrate according to one embodiment of the present invention. A device substrate 40 includes the Group-III element nitride substrate 10 and a functional layer 42 formed on the first main surface (Group-III element polar surface) 11 of the Group-III element nitride substrate 10. The functional layer 42 is typically formed by epitaxially growing a crystal. As described above, the occurrence of warping can be satisfactorily suppressed in the Group-III element nitride substrate 10, and hence the functional layer 42 can be extremely satisfactorily formed. Specifically, in the formation of the functional layer 42, heating unevenness at the time of heating from the Group-III element nitride substrate 10 side is prevented, and hence the functional layer 42 to be obtained can have excellent uniformity. In addition, when the Group-III element nitride substrate 10 in which the occurrence of warping is suppressed is used, workability in the production of the device substrate 40 can be excellent.

The above-mentioned functional layer may function as, for example, a light-emitting layer, a rectifying device layer, a switching device layer, and a power semiconductor layer. In one embodiment, the Group-III element nitride crystal is adopted as a material for forming the above-mentioned functional layer. For example, gallium (Ga), aluminum (Al), or indium (In) is used as a Group-III element for forming a Group-III element nitride. Those elements may be used alone or in combination thereof.

The second main surface (nitrogen polar surface) 12 of the Group-III element nitride substrate 10 may be subjected to processing, such as grinding or polishing, under a state in which the functional layer 42 has been formed on the Group-III element nitride substrate 10 (under a state in which the device substrate 40 has been formed).

EXAMPLES

The present invention is specifically described below by way of Examples, but the present invention is not limited to these Examples. With regard to the crystallinity of a gallium nitride film of a seed crystal substrate described below in a plane thereof, the variation and the ratio $W_B/W_A$ are each a value measured by the following measurement method.

<Crystallinity>

The distribution of crystallinity of the gallium nitride film of the seed crystal substrate (wafer) was evaluated by X-ray diffraction rocking curve measurement (XRC) with an X-ray diffractometer (manufactured by Bruker, "D8-DIS-COVER"). Specifically, a diffraction peak with regard to a (10-12) plane was measured by applying an X-ray condensed with a @1.0 mm collimator at predetermined intervals (e.g., at intervals of from 2 mm to 10 mm) while moving the wafer along an X-axis that is transversal with the wafer and a Y-axis that is longitudinal with the wafer. Thus, a half-width W (arcsec) was calculated. Herein, the X-axis was set to be parallel to the a-axis of a Group-III element nitride crystal, and the Y-axis was set to be parallel to the m-axis of the Group-III element nitride crystal.

When an evaluation object is a wafer having a diameter of 6 inches, measurement was performed at intervals of 9 mm, and data was obtained on 9 points (including an origin) in each of four directions of +X-axes and +Y-axes defining the center of the wafer as the origin.

1. Variation

A variation D (%) was determined from the following equation:

$$D = (M - m)/A \times 100$$

where M represents the maximum value of data measured along the X-axis (data on 17 points), "m" represents the minimum value of the data measured along the X-axis (data on 17 points), and A represents the average of the data measured along the X-axis (data on 17 points).

2. $W_B/W_A$

The average of half-widths measured in a region distant by less than 80% of the radius of the wafer on a radially outer side from the center thereof was represented by $W_A$, and the average of half-widths measured in a region distant by 80% or more of the radius of the wafer on the radially outer side from the center thereof was represented by $W_B$. Thus, the ratio $W_B/W_A$ was calculated.

Comparative Example 1

(Production of Seed Crystal Substrate)

A gallium nitride film having a thickness of 2 µm was formed on a c-plane sapphire substrate having a diameter of 6 inches by a MOCVD method to produce a seed crystal substrate. At the time of the film formation, the temperature of a heater built into a susceptor for mounting the sapphire substrate in a reactor of a MOCVD apparatus was controlled so that the temperature distribution in a plane of the sapphire substrate became ±10° C. The variation in crystallinity of the formed gallium nitride film was 20% or less, and the ratio $W_B/W_A$ was 0.93.

(Growth of Gallium Nitride Crystal)

The growth of a gallium nitride crystal was performed with a crystal-producing apparatus including a pressure-resistant vessel that can supply a pressurized nitrogen gas, a rotary table that can rotate in the pressure-resistant vessel, and an outer vessel to be mounted on the rotary table.

The obtained seed crystal substrate was arranged in an alumina crucible having a diameter of 200 mm in a glove box under a nitrogen atmosphere. Next, metal gallium and metal sodium were loaded into the crucible so that the atomic ratio Ga/(Ga+Na) (mol %) became 15 mol %, followed by the lidding of the crucible with an alumina plate. The crucible was loaded into a stainless steel-made inner vessel under the state, and the vessel was further loaded into a stainless steel-made outer vessel capable of storing the inner vessel, followed by the closing of the outer vessel with a vessel lid mounted with a nitrogen-introducing pipe. The outer vessel was mounted on the rotary table placed in a heating portion in the crystal-producing apparatus under the state, and the pressure-resistant vessel of the crystal-producing apparatus was lidded and hermetically sealed.

Next, the inside of the pressure-resistant vessel was evacuated with a vacuum pump. Subsequently, while the heating portion was operated to heat a heating space so that its temperature became 870° C., a nitrogen gas was introduced into the pressure-resistant vessel until a pressure therein became 4.0 MPa, and the outer vessel was rotated about its central axis at a speed of 20 rpm clockwise and counterclockwise at a certain period. The outer vessel was held under the state for 40 hours.

After that, the temperature was naturally cooled to room temperature, and the pressure was reduced to atmospheric pressure. After that, the lid of the pressure-resistant vessel was opened, and the crucible was removed from its inside. Solidified metal sodium in the crucible was removed, and a seed crystal substrate in which a gallium nitride crystal had been grown was recovered.

After that, at room temperature, UV laser light was applied from the sapphire substrate side of the seed crystal substrate in which the gallium nitride crystal had been grown to decompose the gallium nitride film of the seed crystal substrate. Thus, the grown gallium nitride crystal was separated from the sapphire substrate.

The peripheral edge portion of the separated gallium nitride crystal was ground with diamond abrasive grains so that the diameter thereof was adjusted to 150 mm. Next, the gallium nitride crystal was fixed to a ceramic-made surface plate for processing, and the gallium polar surface of the gallium nitride crystal was ground and polished with a grinder and a lapping apparatus. After that, the resultant surface was subjected to mirror finish with diamond abrasive grains each having a grain diameter of 0.1 µm. Next, the gallium nitride crystal was reversed and fixed to the ceramic-made surface plate for processing, and the nitrogen polar surface thereof was ground and polished in the same manner as in the gallium polar surface. After that, the resultant surface was subjected to mirror finish with diamond abrasive grains each having a grain diameter of 0.1 µm.

Thus, a gallium nitride substrate having a thickness of 500 µm was produced.

Example 1

A gallium nitride substrate was produced in the same manner as in Comparative Example 1 except that the temperature condition of the heater built into the susceptor at the time of the production of the seed crystal substrate (formation of the gallium nitride film) was changed so that the peripheral edge portion of the sapphire substrate was brought into a low-temperature state. In this case, the variation in crystallinity of the gallium nitride film of the seed crystal substrate was about 25%, the ratio $W_B/W_A$ was 1.2, and a tendency that the half-width around the center of the wafer was the smallest and the half-width continuously increased toward the outer periphery thereof was observed.

Example 2

A gallium nitride substrate was produced in the same manner as in Comparative Example 1 except that the temperature, pressure, and rotation conditions were changed so that the growth speed in the peripheral edge portion of the seed crystal substrate increased at the time of the growth of the gallium nitride crystal.

<Evaluation>

The gallium nitride substrate (wafer) obtained in each of Examples and Comparative Example was subjected to the following evaluations. Evaluation results are summarized in Table 1.

1. Distribution of Crystallinity

An evaluation was performed by the same method as in the crystallinity of the gallium nitride film of the seed crystal substrate described above.

2. Warping and Radius of Curvature

The warping of the gallium nitride substrate was measured with a laser displacement sensor (manufactured by Keyence Corporation, "CL-P015"), and the radius of curvature thereof was calculated from the warping. Specifically, the displacement of a main surface of a Group-III element nitride substrate was measured with a confocal system by irradiating the main surface on a side opposite to a side on which the sapphire substrate had been arranged with laser light having a wavelength of 655 nm to provide a waveform for a region except for a region of 3 mm from an end of the gallium nitride substrate. An approximate curve was calculated from the obtained waveform by a least-squares method using a quadratic function. A difference between the maximum value and minimum value of the approximate curve was measured on each of two axes perpendicular to each other on the surface of the substrate, and the average of those values was defined as a warping S. In addition, a radius of curvature R was calculated from the obtained warping S using the following equation (I):

$$R = D^2/(8 \times S) \tag{I}$$

where R represents the radius of curvature, D represents the diameter of the substrate, and S represents the warping, each of which is represented in the unit of [m].

TABLE 1

| | Crystallinity (half-width) | | Warping | Radius of curvature |
|---|---|---|---|---|
| | Variation | $W_B/W_A$ | | |
| Example 1 | 31% | >1.2 | 30 µm | 94 m |
| Example 2 | 38% | >1.2 | 50 µm | 56 m |
| Comparative Example 1 | 20% or less | 0.98 | 105 µm | 27 m |

Figure 6:
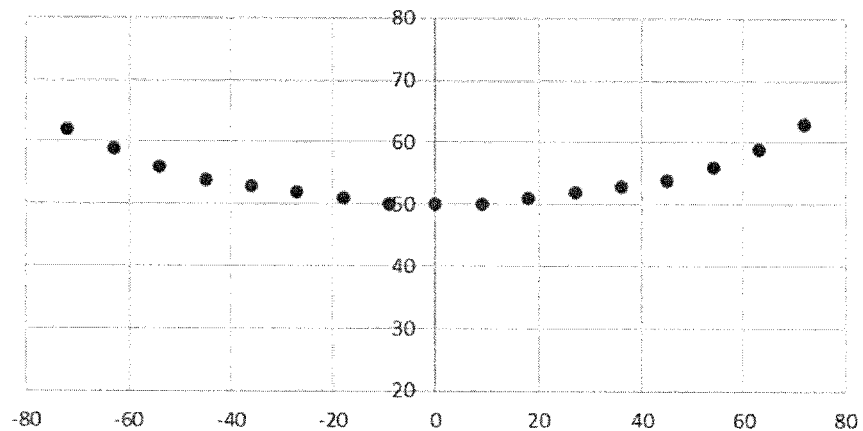
FIG. 6 is a graph for showing the distribution of half-widths W (arcsec) in an X-axis (mm) of a wafer of Example 1.

With regard to the distribution of crystallinity, in Example 1, as illustrated in FIG. 6, a tendency that the half-width around the center of the wafer was the smallest and the half-width continuously increased toward the outer periphery thereof was observed, and the increase in the half-width was particularly remarkable in the region distant by 80% or more of the radius of the wafer on the radially outer side from the center thereof.

Figure 7:
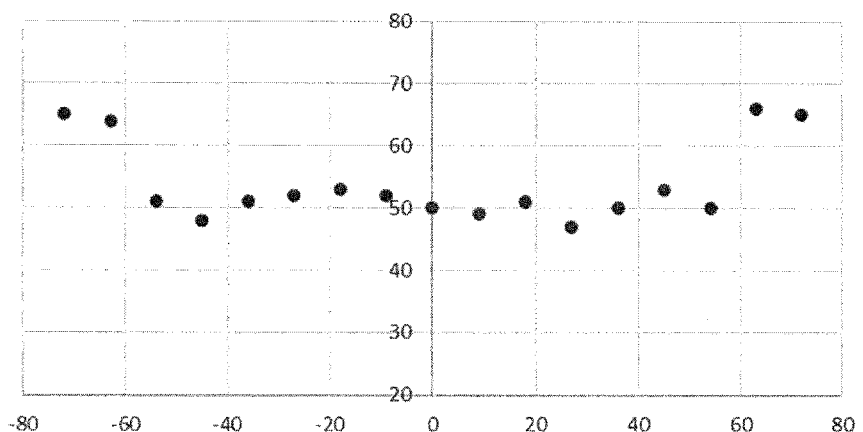
FIG. 7 is a graph for showing the distribution of half-widths W (arcsec) in an X-axis (mm) of a wafer of Example 2.

In Example 2, as illustrated in FIG. 7, the half-width did not show much change in the region distant by less than 80% of the radius of the wafer on the radially outer side from the center thereof, but the half-width abruptly increased in the region distant by 80% or more of the radius of the wafer on the radially outer side from the center thereof.

Figure 8:
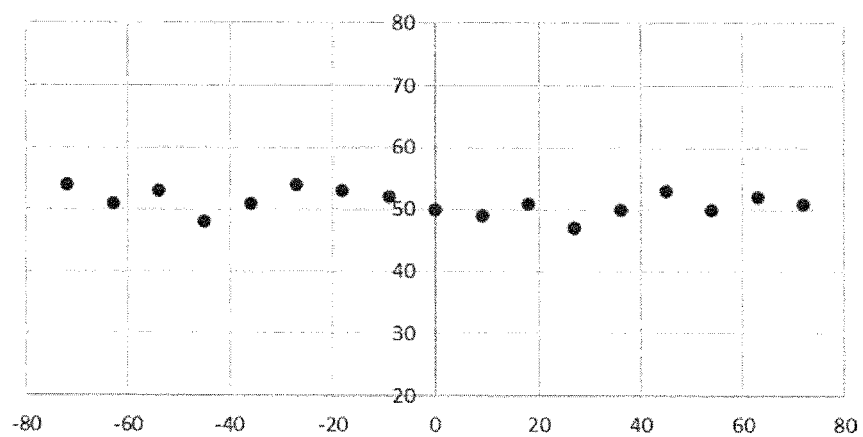
FIG. 8 is a graph for showing the distribution of half-widths W (arcsec) in an X-axis (mm) of a wafer of Comparative Example 1.

In Comparative Example 1, as illustrated in FIG. 8, the half-width did not show much change on the radially outer side from the center of the wafer.

In each of Examples and Comparative Example, convex warping was observed on the side on which the sapphire substrate had been arranged, but the degree thereof was much smaller in each of Examples.

The obtained gallium nitride substrate (wafer) was observed with an optical microscope (200 times). As a result, in Example 2, a low-angle grain boundary was observed in the region distant by 80% or more of the radius of the wafer on the radially outer side from the center thereof. In each of Example 1 and Comparative Example 1, such low-angle grain boundary was not observed.

INDUSTRIAL APPLICABILITY

The Group-III element nitride substrate according to the embodiment of the present invention may be utilized as, for example, each of the substrates of various semiconductor devices.

What is claimed is:

1. A Group-III element nitride substrate, comprising a first main surface and a second main surface facing each other,
   wherein, in the first main surface, crystallinity of a first part positioned on a central portion thereof is higher than crystallinity of a second part positioned outside the first part,
   wherein a half-width W2 of a diffraction peak of a (10-12) plane obtained by X-ray diffraction rocking curve measurement in the second part is larger than a half-width W1 of a diffraction peak of the (10-12) plane obtained by the X-ray diffraction rocking curve measurement in the first part,
   wherein a ratio (W2/W1) of the half-width W2 with respect to the half-width W1 is 1.2 or more.

2. The Group-III element nitride substrate according to claim 1, wherein the Group-III element nitride substrate is a freestanding substrate of a Group-III element nitride crystal.

3. The Group-III element nitride substrate according to claim 1, wherein, in the first main surface, the crystallinity continuously reduces from the first part toward an outer side.

4. The Group-III element nitride substrate according to claim 1, wherein the first main surface includes a region having constant crystallinity from the first part toward an outer side.

5. The Group-III element nitride substrate according to claim 1,
   wherein the Group-III element nitride substrate has a disc shape, and
   wherein the second part is positioned on a region of 20% or less of a radius of the first main surface on a radially inner side from an end of the first main surface.

6. The Group-III element nitride substrate according to claim 1, wherein the second part has a low-angle grain boundary formed therein.

7. The Group-III element nitride substrate according to claim 1,
   wherein the Group-III element nitride substrate has a disc shape, and has a diameter of 75 mm or more.

8. A method of producing the Group-III element nitride substrate of claim 1, the method comprising:
   preparing a seed crystal substrate including a base substrate including an upper surface and a lower surface facing each other, and a seed crystal film to be formed on the upper surface of the base substrate;
   growing a Group-III element nitride crystal on the seed crystal film of the seed crystal substrate; and
   separating the Group-III element nitride crystal from the base substrate,
   wherein a peripheral edge portion of the seed crystal film of the prepared seed crystal substrate has formed therein a changing portion for changing a degree of growth of the Group-III element nitride crystal from a central portion of the seed crystal film.

9. A method of producing the Group-III element nitride substrate of claim 1, the method comprising:
   preparing a seed crystal substrate including a base substrate including an upper surface and a lower surface facing each other, and a seed crystal film to be formed on the upper surface of the base substrate;
   growing a Group-III element nitride crystal on the seed crystal film of the seed crystal substrate; and
   separating the Group-III element nitride crystal from the base substrate,
   wherein growth conditions of the Group-III element nitride crystal are changed between a central portion and a peripheral edge portion of the seed crystal substrate.

10. The production method according to claim 8, wherein the base substrate contains a material different in composition from the Group-III element nitride crystal.

11. The production method according to claim 9, wherein the base substrate contains a material different in composition from the Group-III element nitride crystal.

12. A method of producing a Group-III element nitride substrate from which the second part is removed, the method comprising:
   obtaining the Group-III element nitride substrate of claim 1; and
   removing the second part of the Group-III element nitride substrate.

13. A Group-III element nitride substrate, comprising a first main surface and a second main surface facing each other,
   wherein, in the first main surface, crystallinity of a first part positioned on a central portion thereof is higher than crystallinity of a second part positioned outside the first part,
   wherein the second part has a low-angle grain boundary formed therein.

14. A Group-III element nitride substrate, comprising a first main surface and a second main surface facing each other,
   wherein, in the first main surface, crystallinity of a first part positioned on a central portion thereof is higher than crystallinity of a second part positioned outside the first part,
   wherein, in the first main surface, the crystallinity continuously reduces from the first part toward an outer side.

* * * * *